Sept. 21, 1954
I. VINGRON
2,689,664
COVER FOR DRINKING GLASSES, CUPS, AND THE LIKE
Filed Dec. 6, 1949
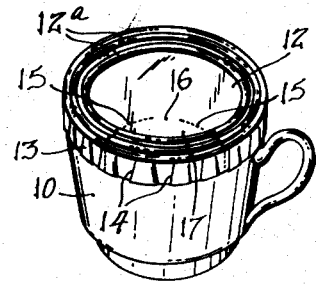
FIG. 1.
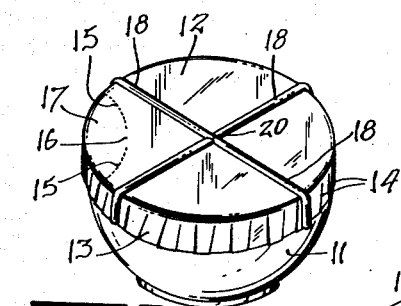
FIG. 3.
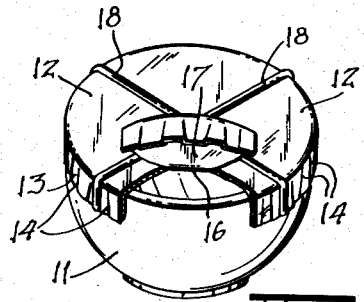
FIG. 4.
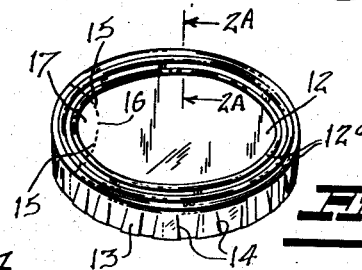
FIG. 2.
FIG. 2A.
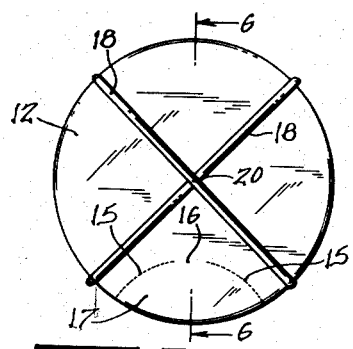
FIG. 5.
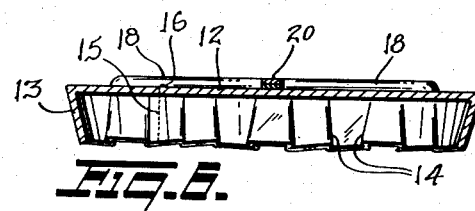
FIG. 6.
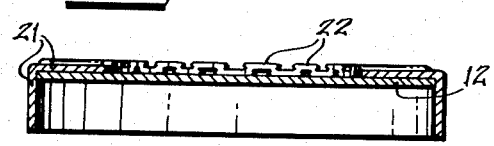
FIG. 8.
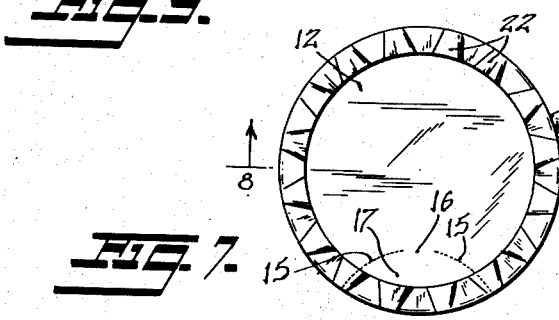
FIG. 7.
INVENTOR.
ILONA VINGRON
BY
ATTORNEY Patented Sept. 21, 1954

2,689,664

UNITED STATES PATENT OFFICE 2,689,664

COVER FOR DRINKING GLASSES, CUPS, AND THE LIKE

Ilona Vingron, Forest Hills, N. Y.

Application December 6, 1949, Serial No. 131,455

1 Claim. (Cl. 215—38)

This invention relates to covers for liquid containing vessels such as cups, bowls, glasses etc.

On shipboard, in trains or airplanes or the like, service of liquid or semi-liquid food or drink is a messy and often hazardous undertaking due to the unstable footing of the servers and the rocking or rolling motion of the tables etc., which causes the liquid to slop over the edges of the containers. This not only is messy, but if the liquid is hot, such as would be the case with soup or coffee or the like, there is danger of scalding.

Covers have been provided for such situations but in general they have not been satisfactory. For example, cups, bowls etc., have been made with in-built covers but difficulty was had in cleaning such vessels in a sanitary manner. Removable covers also have been provided and found unsatisfactory in that the cover had to be removed to partake of the contents of the covered vessel and if such contents were not immediately consumed they slopped over onto the table.

One object of the invention is the provision of a cover to be used once and then discarded, said cover having a flap portion which may be folded back to gain access to the container on which the cover is placed and then refolded to cover the opening.

Another object of the invention is to construct said cover in such manner and of such material that the contents of the vessel on which it is placed are in plain view.

Still another object of the invention is to provide the cover with means whereby it can be secured in place on a container rapidly and securely.

A still further object of the invention is to construct said cover in such manner that it can be manufactured rapidly and inexpensively.

For further comprehension of the invention, and of the objects and advantages thereof, reference will be had to the following description and accompanying drawing, and to the appended claim in which the various novel features of the invention are more particularly set forth.

In the accompanying drawings forming a material part of this disclosure:

Fig. 1 is a perspective view of a cup having thereon a cover constructed in accordance with the invention.

Fig. 2 is an enlarged perspective view of the cover shown in Fig. 1.

Fig. 2A is an enlarged perspective view of the cover shown in Fig. 1.

Fig. 3 is a perspective view of a bowl provided with a reinforced cover in accordance with the present invention.

Fig. 4 is a perspective view similar to Fig. 3, but with the cover flap folded back.

Fig. 5 is an enlarged plan view of the cover shown in Figs. 3 and 4.

Fig. 6 is an enlarged sectional view of the cover on line 6—6 of Fig. 5.

Fig. 7 is a plan view of a modified cover having means for fastening to the lip of a vessel, and Fig. 8 is an enlarged sectional view on line 8—8 of Fig. 7.

Referring to Figs. 1 and 3 there are shown a cup 10 and a bowl 11 each capped by a cover of the invention. The covers for cups, glasses, bowls etc., may all be constructed in the same manner but, preferably stiffening means are provided for the covers adapted to be used with large bowls etc.

The cover in its simplest form is shown in Figs. 1, 2 and 2A and comprises a sheet 12 of transparent inabsorbent material such as waxed paper, synthetic resin or plastic or the like whose peripheral edge is turned down to form a flange 13 to grip the edge of a vessel such as cup 10. In order for the flange 13 to fit snugly against the lip of the cup, it is crinkled as at 14.

It is not desired that the cover be removed from the cup to gain access to the contents thereof and, therefore an arcuate score line 15 is provided in the material of the cover, said score line extending downward to the edge of flange 13 and having an unscored gap 16 therein at its apex.

The construction is such that the material can easily be torn along the score line and the flap 17 formed thereby folded back over the gap 16' in the score line as shown in Fig. 4. Access can then be had to the contents of the vessel, which contents are given little chance to slop over through the small opening. The flap 17 can be folded back in place to fully cover the vessel again if such is desired.

The top wall of the cover shown in Figs. 1 and 2 is formed with concentric score lines 12a so that the top wall can be folded downward along either of the score lines for adapting the cover to fit cups and the like having differently sized top openings.

For bowls and the like that have large opening diameters as illustrated in the modification of the invention shown in Figs. 3 to 6, the cover is provided with stiffening means which comprises a pair of ribs 18 of plastic or rolled waxed paper or the like cemented to the sheet 12. At their centers the ribs are suitably notched as at 20 (Fig. 6) for crossing one another so that both can lie against the sheet 12 throughout their length. At their ends, the ribs are bent downward with the flange 13 and assist in securing the cover on the bowl.

Preferably the ribs 18 are arranged so that they are almost tangent to the arcuate score line 15 (Figs. 3 and 5) and thus materially assist in assuring a clean tear along the score line.

The covers with the ribs 18 are used in the same way and for the same purpose as those described hereinabove.

In the modified form of the invention shown in Figs. 7 and 8, the sheet 12 is not provided with a flange 13 as described hereinabove but is provided along its periphery with a lip 21 of tacky cellulose tape or the like, said lip being crinkled as at 22 and folded over and secured to the top surface of sheet 12 by its own adhesive.

This cover is provided with the same score line 15 as hereinbefore described, said score line being extended downward to the lower edge of the cellulose tape so that the latter is torn too when raising flap 17.

The construction is such that the cover is placed on a vessel and the lip 21 pressed against the wall thereof to secure the cover in place. The raising and lowering of the flap 17 and the other details of the use of the cover are the same as described hereinabove.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A cover for liquid containing vessels having a top opening comprising a sheet of transparent, inabsorbent paper material extended concentrically across the top opening and having its peripheral edge turned down and crinkled to form a flange adapted to have a close fit around the wall of the vessel, and a pair of separate crossed ribs secured to the upper surface of said sheet to stiffen said sheet at their outer ends and extending downward at their outer ends with said flange to assist in securing the cover in place, said ribs being notched complementarily at their cross-over point to allow of their both lying flat against and being secured to said sheet throughout their lengths and dividing said sheet into a plurality of equal segmental sections, one of said sections being provided with an arcuate score line extending at both ends to the edge of the flange of said section and having a gap at its apex.

References Cited in the file of this patent

UNITED STATES PATENTS

| Number | Name | Date |
|---|---|---|
| 772,557 | Dennison | Oct. 18, 1904 |
| 810,834 | Ziegler | Jan. 23, 1906 |
| 1,156,391 | Conard | Oct. 12, 1915 |
| 1,243,033 | Beatty | Oct. 16, 1917 |
| 1,610,501 | Ellerman | Dec. 14, 1926 |
| 1,638,490 | Kuhne | Aug. 9, 1927 |
| 1,778,933 | Blyth | Oct. 21, 1930 |
| 2,041,185 | Jacobs | May 19, 1936 |
| 2,068,735 | De La Minardiere et al. | Jan. 26, 1937 |
| 2,074,325 | Carew | Mar. 23, 1937 |
| 2,133,861 | Huntley | Oct. 18, 1938 |
| 2,157,601 | Gammeter | May 9, 1939 |
| 2,181,150 | Pittenger | Nov. 28, 1939 |
| 2,338,019 | Baker et al. | Dec. 28, 1943 |
| 2,360,849 | Clements et al. | Oct. 24, 1944 |
| 2,453,393 | Wilson | Nov. 9, 1948 |

FOREIGN PATENTS

| Number | Country | Date |
|---|---|---|
| 372,603 | Great Britain | May 12, 1932 |
| 57,869 | Denmark | Aug. 5, 1940 |